United States Patent
Fu et al.

(10) Patent No.: US 8,269,932 B2
(45) Date of Patent: Sep. 18, 2012

(54) LIQUID CRYSTAL DISPLAY SCREEN HAVING CARBON NANOTUBES

(75) Inventors: Wei-Qi Fu, Beijing (CN); Liang Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 872 days.

(21) Appl. No.: 12/313,452

(22) Filed: Nov. 20, 2008

(65) Prior Publication Data

US 2009/0195742 A1    Aug. 6, 2009

(51) Int. Cl.
*G02F 1/1337* (2006.01)
*G02F 1/1333* (2006.01)

(52) U.S. Cl. .................. 349/123; 349/128; 349/158

(58) Field of Classification Search .................. 349/123, 349/128, 158
See application file for complete search history.

(56) References Cited

U.S. PATENT DOCUMENTS

| | | | |
|---|---|---|---|
| 7,045,108 B2 | 5/2006 | Jiang et al. | |
| 7,794,639 B2 | 9/2010 | Huang et al. | |
| 2001/0002858 A1* | 6/2001 | Kageyama et al. | 349/158 |
| 2004/0047038 A1 | 3/2004 | Jiang et al. | |
| 2004/0053780 A1 | 3/2004 | Jiang et al. | |
| 2005/0007648 A1 | 1/2005 | Wu et al. | |
| 2005/0110938 A1* | 5/2005 | Wu | 349/158 |
| 2006/0113510 A1 | 6/2006 | Luo et al. | |
| 2007/0003711 A1* | 1/2007 | Hwang et al. | 428/1.31 |
| 2007/0115413 A1* | 5/2007 | Liu et al. | 349/123 |
| 2007/0116916 A1 | 5/2007 | Ito et al. | |
| 2007/0296897 A1* | 12/2007 | Liu et al. | 349/123 |
| 2009/0073363 A1 | 3/2009 | Fu et al. | |
| 2009/0272935 A1 | 11/2009 | Hata et al. | |

FOREIGN PATENT DOCUMENTS

| | | |
|---|---|---|
| CN | 1483667 A | 3/2004 |
| CN | 1781034 | 5/2006 |
| CN | 1955819 A | 5/2007 |
| CN | 1979948 | 6/2007 |
| JP | 2002-250909 | 9/2002 |
| JP | 2004-102217 | 4/2004 |
| JP | 2004-107196 | 4/2004 |

(Continued)

OTHER PUBLICATIONS

Fan et al., Explorations on growth mechanism, controlled synthesis and applications of carbon nanotubes, Physics, vol. 35, No. 5, pp. 376-381, (2006).

(Continued)

*Primary Examiner* — Nathanael R Briggs
(74) *Attorney, Agent, or Firm* — Altis Law Group, Inc.

(57) ABSTRACT

A liquid crystal display screen includes a first substrate, a first alignment layer, a liquid crystal layer, a second alignment layer, and a second substrate. The liquid crystal layer is sandwiched therebetween. The first alignment layer and the second alignment layer correspondingly are disposed on the first substrate and the second substrate. The first alignment layer and the second alignment layer respectively include a plurality of parallel first grooves and perpendicular second grooves. Furthermore, at least one of the alignment layers includes a carbon nanotube layer. The carbon nanotube layer includes at least one carbon nanotube film. The carbon nanotube film comprising a plurality of carbon nanotubes joined end to end and substantially aligned along a single direction.

16 Claims, 6 Drawing Sheets

FOREIGN PATENT DOCUMENTS

| | | |
|---|---|---|
| JP | 2004-348121 | 12/2004 |
| JP | 2006-201575 | 8/2006 |
| JP | 2007-122057 | 5/2007 |
| JP | 2007-182352 | 7/2007 |
| JP | 2007-314776 | 12/2007 |
| JP | 2008-3606 | 1/2008 |
| TW | 200417510 | 3/1992 |
| TW | 200941094 | 3/1997 |
| TW | I228605 | 3/2005 |
| TW | I255487 | 5/2006 |
| TW | 200621631 | 7/2006 |
| TW | 200938917 | 9/2009 |

OTHER PUBLICATIONS

Xiang Iin Liu, Physics New Knowledge. Physics bimonthly journal, vol. 27, No. 5, pp. 720-721, (2005).

* cited by examiner

LIQUID CRYSTAL DISPLAY SCREEN HAVING CARBON NANOTUBES

RELATED APPLICATIONS

This application is related to commonly-assigned applications entitled "LIQUID CRYSTAL DISPLAY SCREEN", filed Ser. No. 12/313,394; "METHOD FOR MAKING LIQUID CRYSTAL DISPLAY SCREEN", filed Ser. No. 12/313,450; "LIQUID CRYSTAL DISPLAY SCREEN", filed Ser. No. 12/313,393; "LIQUID CRYSTAL DISPLAY SCREEN", filed Ser. No. 12/313,415; "LIQUID CRYSTAL DISPLAY SCREEN", filed Ser. No. 12/313,440; and "METHOD FOR MAKING LIQUID CRYSTAL DISPLAY SCREEN", filed Ser. No. 12/313,414. The disclosures of the above-identified applications are incorporated herein by reference.

BACKGROUND

1. Field of the Invention

The present invention relates to a liquid crystal display screen with a carbon-nanotube based alignment layer.

2. Discussion of Related Art

Figure 6:
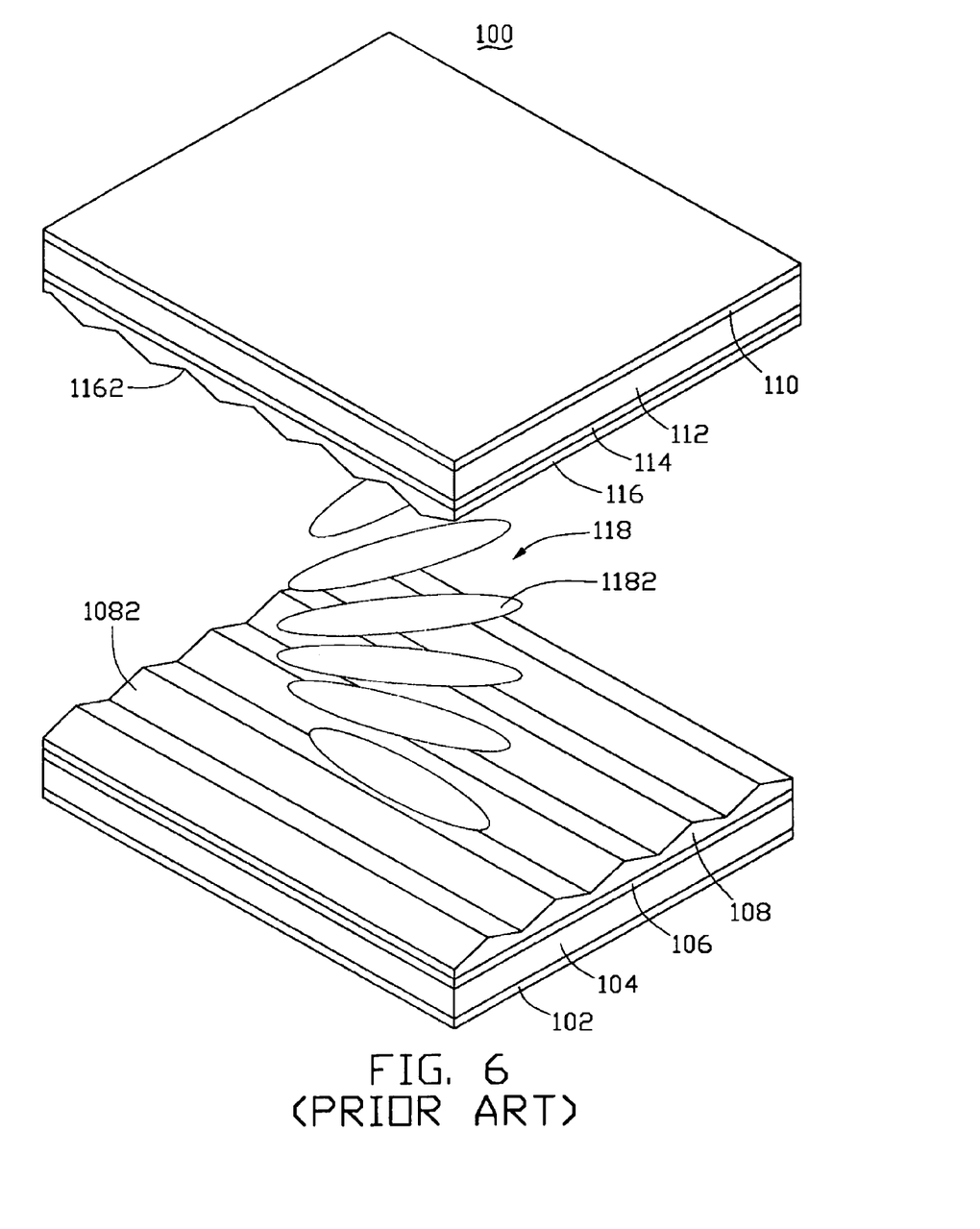
FIG. 6 is a schematic, isometric view of a conventional liquid crystal display screen, according to the prior art.

Referring to FIG. 6, a conventional liquid crystal display screen 100 for a liquid crystal display (LCD), according to the prior art, generally includes a first substrate 104, a second substrate 112, and a liquid crystal layer 118. The first substrate 104 is disposed parallel to the second substrate 112. The liquid crystal layer 118 is located between the first substrate 104 and the second substrate 112. A first transparent electrode layer 106 and a first alignment layer 108 are formed in that order on an inner surface of the first substrate 104 that faces toward the liquid crystal layer 118. A first polarizer 102 is formed on an outer surface of the first substrate 104 that faces away from the liquid crystal layer 118. A second transparent electrode layer 114 and a second alignment layer 116 are formed in that order on an inner surface of the second substrate 112 that faces toward the liquid crystal layer 118. A second polarizer 110 is formed on an outer surface of the second substrate 112 that faces away from the liquid crystal layer 118.

The quality and performance of the alignment layers 108, 116 are key factors that determine the display quality of the liquid crystal display screen 100. A high quality liquid crystal display screen demands steady and uniform arrangement of liquid crystal molecules 1182 of the liquid crystal layer 118. This is achieved in part by correct arrangement of the liquid crystal molecules 1182 at the alignment layers 108, 116. Materials to make the alignment layers 108, 116 are typically selected from the group consisting of polystyrene, polystyrene derivative, polyimide, polyvinyl alcohol, epoxy resin, polyamine resin, and polysiloxane. The selected material used to create a preform of each alignment layer 108, 116. The preform is then treated by one method selected from the group consisting of rubbing, incline silicon oxide evaporation, and atomic beam alignment micro-treatment. Thereby, grooves 1082 or 1162 are formed on the treated surface of the preform, and the alignment layer 108, 116 is obtained. The grooves 1082 or 1162 affect the arrangement and orientations of the liquid crystal molecules 1182.

In the liquid crystal display screen 100, the liquid crystal molecules 1182 are cigar-shaped. A plurality of the parallel first grooves 1082 is formed at an inner surface of the first alignment layer 108. A plurality of the parallel second grooves 1162 is formed at an inner surface of the second alignment layer 116. A direction of alignment of each of the first grooves 1082 is perpendicular to a direction of alignment of each of the second grooves 1162. The grooves 1082, 1162 function so as to align the orientation of the liquid crystal molecules 1182. In particular, the liquid crystal molecules 1182 adjacent to the alignment layers 108, 116 are aligned parallel to the grooves 1082, 1162 respectively. When the grooves 1082 and 1162 are at right angles and the substrates 104, 112 are spaced an appropriate distance from each other, the liquid crystal molecules 1182 can automatically twist progressively over a range of 90 degrees from the top of the liquid crystal layer 118 to the bottom of the liquid crystal layer 118.

The polarizers 102 and 110 and the transparent electrode layers 106, 114 play important roles in the liquid crystal display screen 100. However, the polarizers 102, 110 and the transparent electrode layers 106, 114 may make the liquid crystal display screen 100 unduly thick, and may reduce the transparency of the liquid crystal display screen 100. Moreover, the polarizers 102, 110 and the transparent electrode layers 106, 114 typically increase the cost of manufacturing the liquid crystal display screen 100.

What is needed, therefore, is to provide a liquid crystal display screen with a simple structure, reduced thickness, and good arrangement of liquid crystal molecules.

SUMMARY

A liquid crystal display screen includes a first substrate, a first alignment layer, a liquid crystal layer, a second alignment layer, and a second substrate. The liquid crystal layer is sandwiched between the first substrate and the second substrate. The first alignment layer is disposed on the first substrate, and facing the liquid crystal layer. The first alignment layer includes a plurality of parallel first grooves facing the liquid crystal layer. The second alignment layer is disposed on the second substrate, and facing the liquid crystal layer. The second alignment layer includes a plurality of parallel second grooves facing the liquid crystal layer. An alignment direction of the first grooves is perpendicular to that of the second grooves. Furthermore, at least one of the first alignment layer and the second alignment layer includes a carbon nanotube layer. The carbon nanotube layer includes at least one carbon nanotube film and the carbon nanotube film comprising a plurality of carbon nanotubes joined end to end and substantially aligned along a single direction.

Other novel features and advantages of the present liquid crystal display screen will become more apparent from the following detailed description of the present embodiments when taken in conjunction with the accompanying drawings.

BRIEF DESCRIPTION OF THE DRAWINGS

Many aspects of the present liquid crystal display screen can be better understood with reference to the following drawings. The components in the drawings are not necessarily to scale, the emphasis instead being placed upon clearly illustrating the principles of the present liquid crystal display screen.

Corresponding reference characters indicate corresponding parts throughout the several views. The exemplifications set out herein illustrate at least one embodiment of the present liquid crystal display screen, in at least one form, and such exemplifications are not to be construed as limiting the scope of the invention in any manner.

DETAILED DESCRIPTION OF EXEMPLARY EMBODIMENTS

Reference will now be made to the drawings to describe, in detail, various embodiments of the present liquid crystal display screen.

Figure 1:
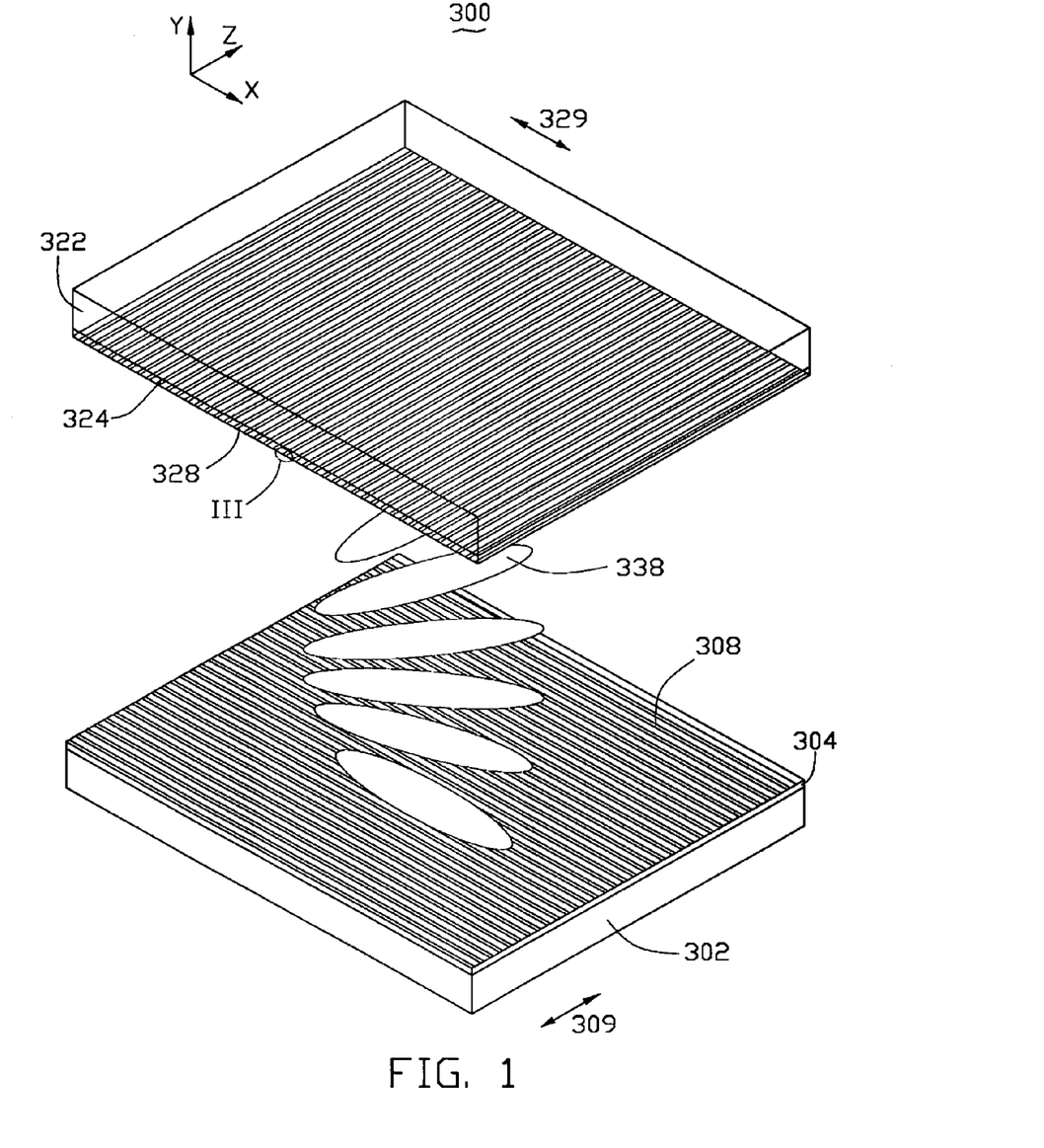
FIG. 1 is a schematic, isometric view of a liquid crystal display screen in accordance with one embodiment of the present invention.

Referring to FIG. 1, a liquid crystal display screen 300 includes a first substrate 302, a first alignment layer 304, a liquid crystal layer 338, a second alignment layer 324, and a second substrate 322. The first substrate 302 is generally opposite to the second substrate 322. The liquid crystal layer 338 is sandwiched between the first substrate 302 and the second substrate 322. The first alignment layer 304 is disposed on the first substrate 302, adjacent to the liquid crystal layer 338. The first alignment layer 304 includes a plurality of parallel first grooves 308 facing the liquid crystal layer 338. The second alignment layer 324 is disposed on the second substrate 322, adjacent to the liquid crystal layer 338. The second alignment layer 324 includes a plurality of parallel second grooves 328 facing the liquid crystal layer 338. An alignment direction of the first grooves 308 is perpendicular to an alignment direction of the second grooves 328.

A material of the first substrate 302 and the second substrate 322 can be glass, quartz, diamond, and plastics. In the present embodiment, the first substrate 302 and the second substrate 322 are made of flexible materials, such as cellulose triacetate (CTA).

The liquid crystal layer 338 includes a plurality of cigar shaped liquid crystal molecules. Understandably, the liquid crystal layer 338 can also be made of other suitable materials.

Figure 2:
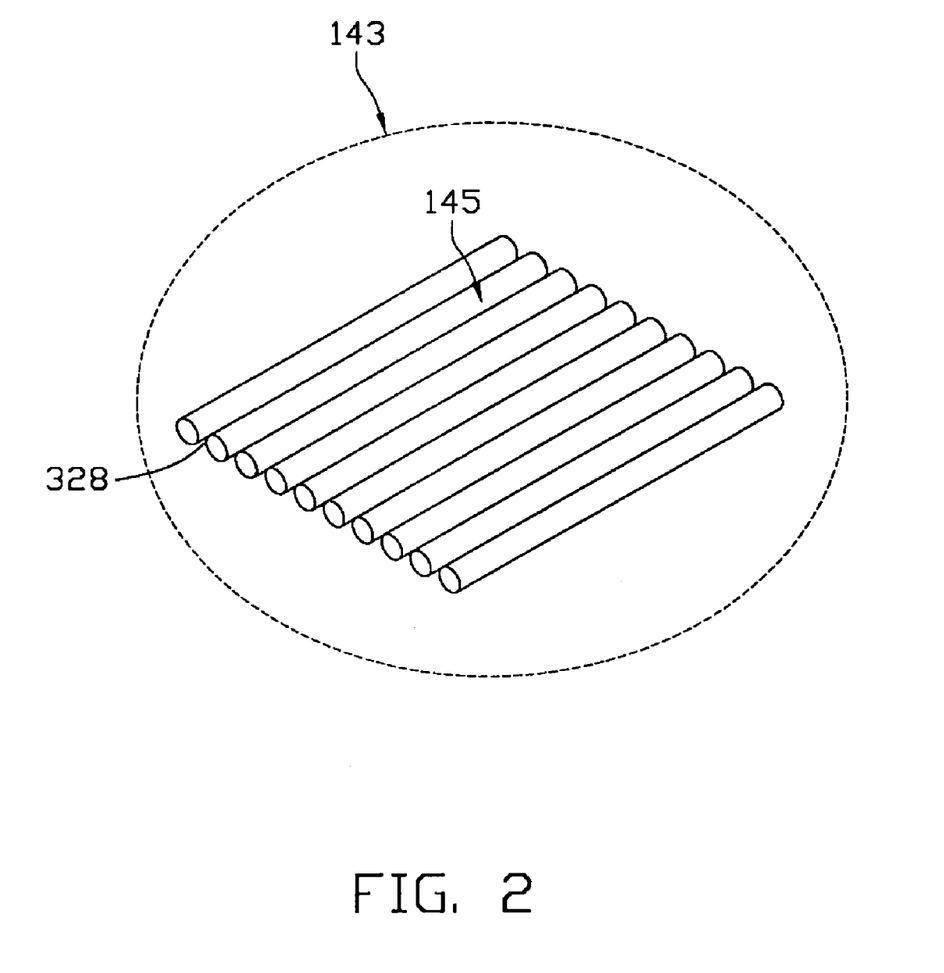
FIG. 2 is an enlarged view of a circled area labeled II shown in FIG. 1.
Figure 3:
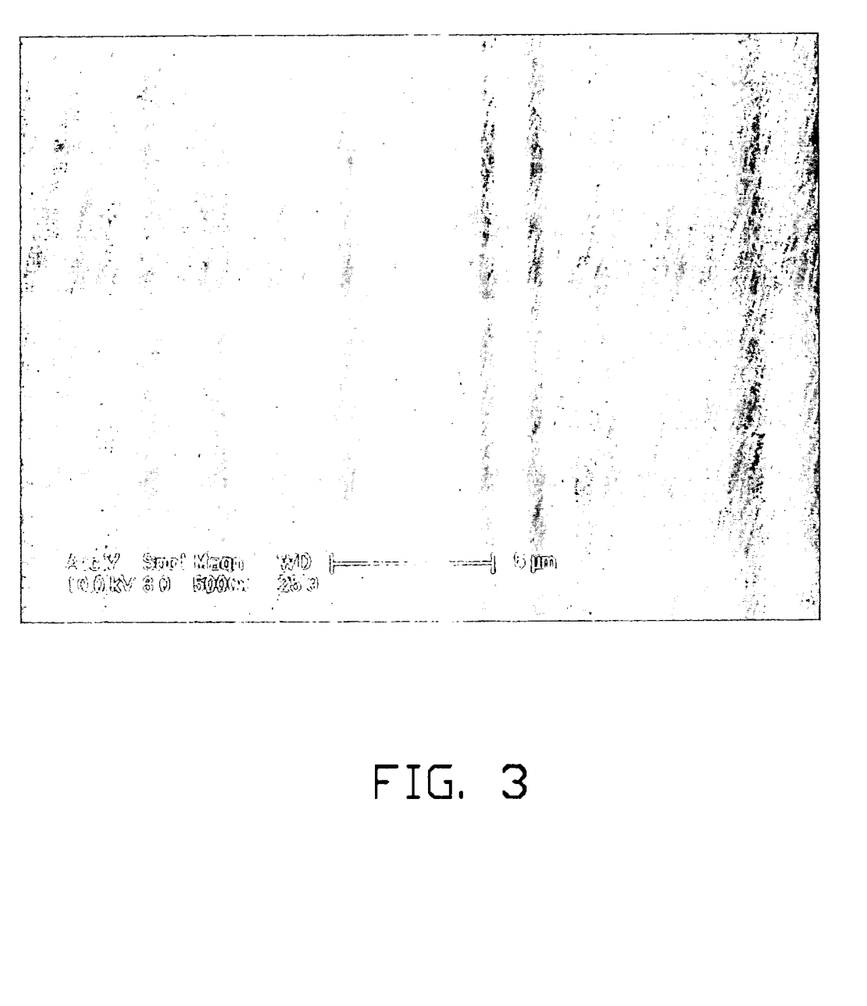
FIG. 3 shows a Scanning Electron Microscope (SEM) image of a carbon nanotube film used as an alignment layer in the liquid crystal display screen of the present embodiment.

The first alignment layer 304 includes a carbon nanotube layer. The carbon nanotube layer is comprised of at least one carbon nanotube film. Referring to FIGS. 2 and 3, each carbon nanotube film comprises a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the carbon nanotube film 143 are also oriented along a preferred orientation. A length and a width of the carbon nanotube film can be arbitrarily set as desired. A thickness of the carbon nanotube film is in an approximate range from 0.5 nanometers to 100 micrometers.

Also, the carbon nanotube layer can include multiple stacked carbon nanotube films. The carbon nanotubes in the adjacent carbon nanotube films are preferred oriented along a same direction. Understandably, the carbon nanotubes 145 arranged in parallel define a plurality of parallel gaps, which define the first grooves 308. The first grooves 308 affect the alignment of the liquid crystal molecules.

Either the first or second alignment layers 304, 324 can be a conventional alignment layer such as a polyamide layer, or a carbon nanotube layer. In the present embodiment, the second alignment layer 324 is a carbon nanotube layer. In order to keep an alignment direction of the first grooves 308 perpendicular to an alignment direction of the second grooves 328, the alignment direction of the carbon nanotubes in the first alignment layer 304 is perpendicular to the alignment direction of the carbon nanotubes in the second alignment layer 324. Specifically, the carbon nanotubes in the first alignment layer 304 are each aligned parallel to the X-axis, and the carbon nanotubes in the second alignment layer 324 are each aligned parallel to the Z-axis. A thickness of each of the first alignment layer 304 and the second alignment layer 324 is in a range from about 20 nanometers to about 5 micrometers.

Due to the carbon nanotube layers having good tensile properties, when the first substrate 302 and the second substrate 322 are made of the flexible materials, the liquid crystal display screen 300 is correspondingly flexible. Moreover, the carbon nanotubes provide each carbon nanotube layer with good electrical conductivity. Thus, each carbon nanotube layer can be used to conduct electricity and thereby replace a conventional transparent electrode layer. The carbon nanotube layer can act as both an alignment layer and an electrode layer. This simplifies the structure, eliminates parts while maintaining the same function, reduces the thickness of the liquid crystal display screen 300, and enhances the efficiency of usage of an associated backlight.

Because the carbon nanotubes in each carbon nanotube layer are arranged in parallel, the carbon nanotube layer has a light polarization characteristic, and thus can be used to replace a conventional polarizer. In the present embodiment, at least one polarizer (not shown) is disposed on a surface of the first substrate 302 and/or on a surface of the second substrate 322.

In the following description, unless the context indicates otherwise, it will be assumed that each carbon nanotube layer is formed of a single carbon nanotube film.

A method for fabricating an above-described carbon nanotube film includes the steps of: (a) providing an array of carbon nanotubes, including super-aligned arrays; (b) pulling out a carbon nanotube film from the array of carbon nanotubes, by using a tool (e.g., adhesive tape, pliers, tweezers, or another tool allowing multiple carbon nanotubes to be gripped and pulled simultaneously).

In step (a), a given super-aligned array of carbon nanotubes can be formed by the substeps of: (a1) providing a substantially flat and smooth substrate; (a2) forming a catalyst layer on the substrate; (a3) annealing the substrate with the catalyst layer in air at a temperature in an approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can be a P-type silicon wafer, an N-type silicon wafer, or a silicon wafer with a film of silicon dioxide thereon. A 4-inch P-type silicon wafer is used as the substrate in the present embodiment.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, have a height of about 50 microns to about 5 millimeters and include a plurality of carbon nanotubes 145 parallel to each other and approximately perpendicular to the substrate. The carbon nanotubes 145 in the super-aligned array of carbon nanotubes can be multi-walled carbon nanotubes, double-walled carbon nanotubes or single-walled carbon nanotubes. Diameters of the single-walled carbon nanotubes range from about 0.5 to about 50 nanometers. Diameters of the double-walled carbon nanotubes range from about 1 to about 50 nanometers. Diameters of the multi-walled carbon nanotubes range from about 1.5 to 50 about nanometers.

The super-aligned array of carbon nanotubes formed under the above conditions is essentially free of impurities such as carbonaceous or residual catalyst particles. The carbon nanotubes 145 in the super-aligned array are closely packed together by van der Waals attractive force therebetween.

In step (b), the carbon nanotube film can be formed by the substeps of: (b1) selecting one or more carbon nanotubes having a predetermined width from the array of carbon nanotubes; and (b2) pulling the carbon nanotubes to form nanotube segments 143 at an even/uniform speed to achieve a uniform carbon nanotube film.

In step (b1), quite usefully, the carbon nanotube segment 143 includes a plurality of carbon nanotubes 145 parallel to each other. The carbon nanotube segments 143 can be selected by using an adhesive tape as the tool to contact the super-aligned array of carbon nanotubes. In step (b2), the pulling direction is substantially perpendicular to the growing direction of the super-aligned array of carbon nanotubes.

More specifically, during the pulling process, as the initial carbon nanotube segments 143 are drawn out, other carbon nanotube segments 143 are also drawn out end to end due to van der Waals attractive force between ends of adjacent carbon nanotube segments 143. This process of drawing ensures a substantially continuous and uniform carbon nanotube film can be formed.

The carbon nanotube film includes a plurality of carbon nanotube segments 143. The carbon nanotubes 145 in the carbon nanotube film are all substantially parallel to the pulling/drawing direction of the carbon nanotube film, and the carbon nanotube film produced in such manner can be selectively formed having a predetermined width. The carbon nanotube film formed by the pulling/drawing method has superior uniformity of thickness and conductivity over a disordered carbon nanotube film. Further, the pulling/drawing method is simple, fast, and suitable for industrial applications.

In the present embodiment, each carbon nanotube layer includes at least two carbon nanotube films. Each carbon nanotube film comprises a plurality of carbon nanotube segments 143 which are comprised of a plurality of carbon nanotubes 145 arranged along a same direction. The direction is generally the pulling direction. As such, at least two carbon nanotube films are arranged on top of one another. The carbon nanotubes in the adjacent two carbon nanotube films are oriented along a same direction. Uniform and parallel gaps which exist between the parallel carbon nanotubes of the carbon nanotube films constitute the first grooves 308 or/and the second grooves 328.

The width of the carbon nanotube film depends on a size of the carbon nanotube array. The length of the carbon nanotube film can be arbitrarily set, as desired. In one useful embodiment, when the substrate is a 4 inch type wafer as in the present embodiment, the width of the carbon nanotube film ranges from about 0.5 nanometers to about 10 centimeters, and the thickness of the carbon nanotube film ranges from about 0.5 nanometers to about 100 micrometers. The carbon nanotubes in the carbon nanotube film can be selected from a group consisting of single-walled carbon nanotubes, double-walled carbon nanotubes, and multi-layer carbon nanotubes. Diameters of the single-walled carbon nanotubes range from about 0.5 to about 50 nanometers. Diameters of the double-walled carbon nanotubes range from about 1 to about 50 nanometers. Diameters of the multi-walled carbon nanotubes range from about 1.5 to about 50 nanometers.

It is noted that because the carbon nanotubes in the super-aligned carbon nanotube array have a high purity and a high specific surface area, the carbon nanotube film is adherent in nature. As such, the first carbon nanotube film can be adhered directly to a surface of the first substrate 302, the second substrate 322 or other films. In the alternative, other bonding means can be applied.

The carbon nanotube film, once adhered to a surface of the first substrate 302 or the second substrate 322 can be treated with an organic solvent. The carbon nanotube film can be treated by using organic solvent to soak the entire surface of the carbon nanotube film. The organic solvent is volatilizable and can, suitably, be selected from the group consisting of ethanol, methanol, acetone, dichloroethane, chloroform, and combinations thereof. In the present embodiment, the organic solvent is ethanol. After being soaked by the organic solvent, microscopically, carbon nanotube strings will be formed by adjacent carbon nanotubes in the carbon nanotube film, that are able to do so, bundling together, due to the surface tension of the organic solvent. The contacting area of the carbon nanotube film with the substrate will increase, and thus, the carbon nanotube film can more firmly adhere to the surface of the first substrate 302 or the second substrate 322. In another aspect, due to the decrease of the specific surface area via bundling, the mechanical strength and toughness of the carbon nanotube film are increased and the coefficient of friction of the carbon nanotube films is reduced. Macroscopically, the film will be an approximately uniform carbon nanotube film.

Figure 4:
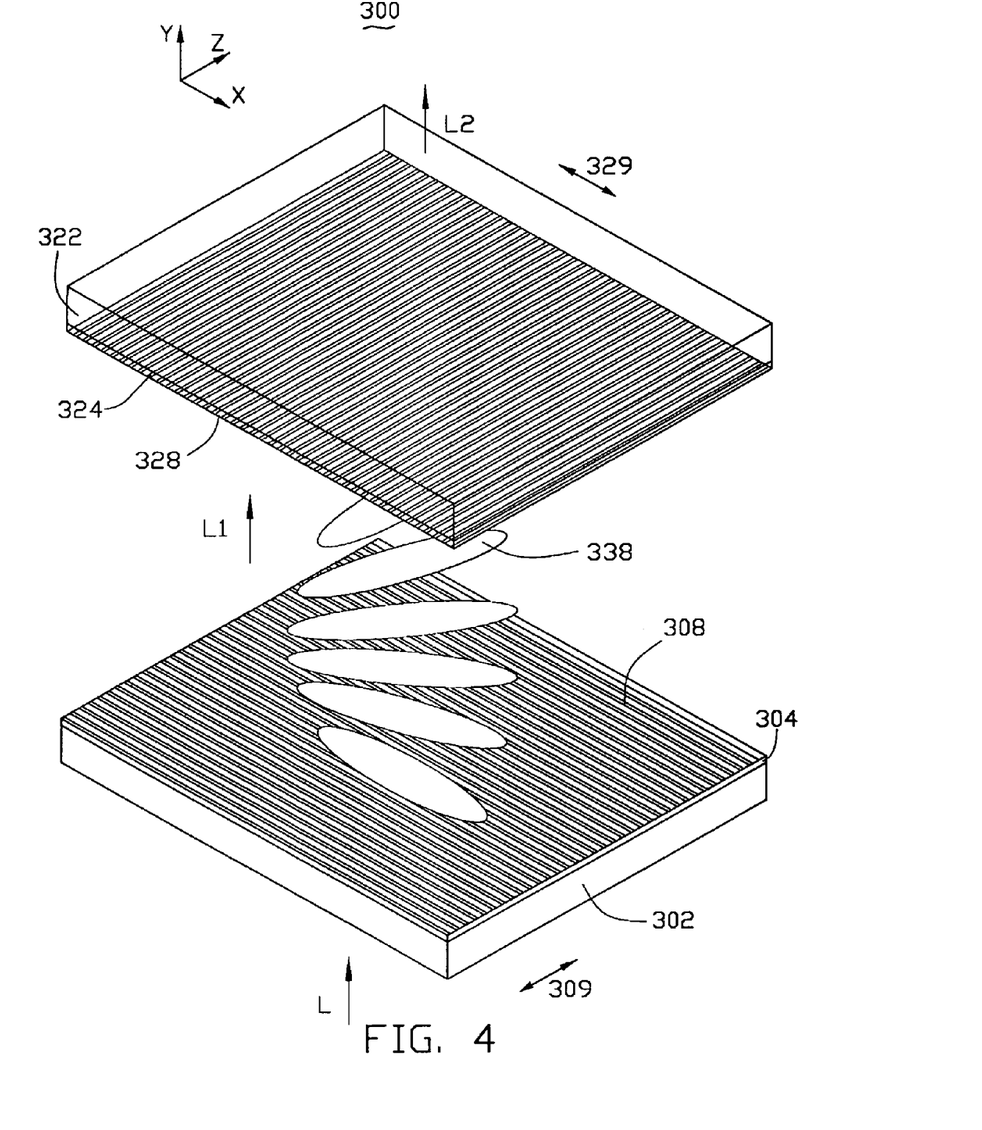
FIG. 4 is similar to FIG. 1, showing the liquid crystal display screen in a light transmitting state.

Referring to FIG. 4, when no voltage is applied to the alignment layers 304, 324, the arrangement of the liquid crystal molecules is in accordance with alignment directions of the alignment layers 304, 324. In this embodiment, the alignment directions of the alignment layers 304, 324 are at right angles, so the liquid crystal molecules can automatically orient so that they turn a total of 90 degrees from a top of the liquid crystal layer 338 to a bottom of the liquid crystal layer 338. When light L is incident upon the first alignment layer 304, because a transmission axis 309 of the first alignment layer 304 is along the direction of the z-axis, only polarization light L1 with a polarization direction parallel to the transmission axis 309 can pass through the first alignment layer 304. When the polarization light L1 passes through the liquid crystal molecules, because the liquid crystal molecules turn 90 degrees from bottom to top, the polarization direction of the polarization light L1 is also turned 90 degrees and becomes L2 which is parallel to the direction of the x-axis. The polarization light L1 passing through the liquid crystal molecules to form L2, and L2 can pass through the second alignment layer 324 because a transmission axis 329 of the second alignment layer 324 is along the direction of the x-axis. As a result, the liquid crystal display screen 300 transmits light.

Figure 5:
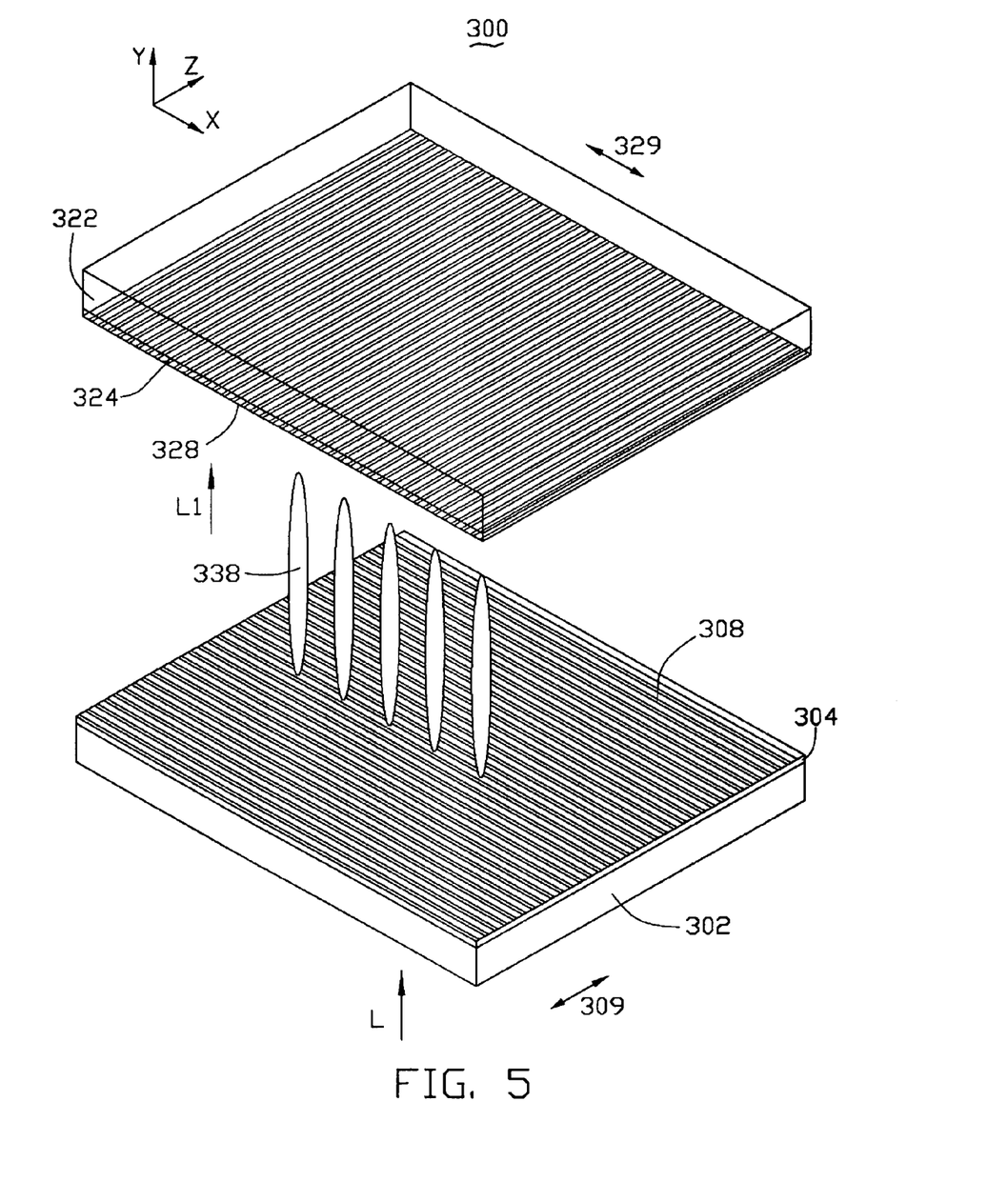
FIG. 5 is similar to FIG. 4, but showing the liquid crystal display screen in a light blocking state.

Referring to FIG. 5, when a voltage is applied to the alignment layers 304, 324, an electrical field with a direction perpendicular to the alignment layers 304, 324 is formed. Under the influence of the electrical field, the liquid crystal molecules orient to become parallel to the direction of the electrical field. Accordingly, the polarized light L1 passing through the liquid crystal molecules maintains its polarization direction along the z-axis and cannot pass through the second alignment layer 324, whose polarization is along the x-axis. As a result, second alignment layer 324 blocks the light L1.

The present liquid crystal display screen 300 has at least the following advantages. Firstly, each carbon nanotube layer comprising of the carbon nanotube film has a plurality of carbon nanotubes, therefore the carbon nanotube layer has excellent electrical conductivity. Thus, the carbon nanotube layer can be used to conduct electricity and thereby replace a conventional transparent electrode layer. That is, the carbon nanotube layer can act as both an alignment layer and an electrode layer. This simplifies the structure and reduces the thickness of the liquid crystal display screen 300, and enhances the efficiency of usage of an associated backlight, all while retaining functionality. Secondly, the carbon nanotube film is achieved by the pulling out from an array of carbon nanotubes without other mechanical treatment (such as rubbing the carbon nanotube film). Thus the conventional art problem of electrostatic charge and dust contamination can be avoided, and the corresponding alignment layer 304, 324 has good alignment quality.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A liquid crystal display screen comprising:
   a first substrate;
   a second substrate;
   a liquid crystal layer sandwiched between the first substrate and the second substrate;
   a first alignment layer disposed on the first substrate, the first alignment layer comprising a plurality of parallel first grooves;
   a second alignment layer disposed on the second substrate, the second alignment layer comprising a plurality of parallel second grooves, an alignment direction of the second grooves being perpendicular to an alignment direction of the first grooves; and
   at least one of the first and second alignment layers comprising a carbon nanotube layer, the carbon nanotube layer comprising at least one carbon nanotube film, the carbon nanotube film comprising a plurality of carbon nanotubes joined end to end substantially along an axial direction of the carbon nanotubes.

2. The liquid crystal display screen of claim 1, wherein the carbon nanotube layer comprises at least two stacked carbon nanotube films, and the carbon nanotubes in the adjacent carbon nanotube films are preferred oriented along the same direction.

3. The liquid crystal display screen of claim 1, wherein the carbon nanotube film comprises a plurality of successively oriented carbon nanotube segments joined end to end by van der Waals attractive force therebetween, and each carbon nanotube segment comprises the plurality of carbon nanotubes that are combined by van der Waals attractive force therebetween.

4. The liquid crystal display screen of claim 1, wherein a plurality of parallel gaps are defined between the adjacent carbon nanotubes and the gaps define the first grooves, the second grooves, or the first grooves and the second grooves.

5. The liquid crystal display screen of claim 1, wherein the carbon nanotubes in the carbon nanotube layer are selected from the group consisting of single-walled carbon nanotubes, double-walled carbon nanotubes, and multi-walled carbon nanotubes.

6. The liquid crystal display screen of claim 5, wherein diameters of the single-walled carbon nanotubes range from about 0.5 nanometers to about 50 nanometers, diameters of the double-walled carbon nanotubes range from about 1 nanometer to about 50 nanometers, and diameters of the multi-walled carbon nanotubes range from about 1.5 nanometers to about 50 nanometers.

7. The liquid crystal display screen of claim 1, wherein both the first alignment layer and the second alignment layer comprise a carbon nanotube layer.

8. The liquid crystal display screen of claim 1, wherein a thickness of the first alignment layer is in a range from about 20 nanometers to about 5 micrometers, and a thickness of the second alignment layer is in a range from about 20 nanometers to about 5 micrometers.

9. The liquid crystal display screen of claim 1, wherein the first substrate and the second substrate are made of transparent material.

10. The liquid crystal display screen of claim 9, wherein the transparent material is flexible.

11. The liquid crystal display screen of claim 10, wherein the flexible, transparent material comprises cellulose triacetate.

12. The liquid crystal display screen of claim 9, wherein the transparent material is selected from the group consisting of glass, silicon, diamond, and plastics.

13. The liquid crystal display screen of claim 1, further comprising at least one polarizer, the at least one polarizer is located on the first substrate, the second substrate, or the first and second substrate.

14. A liquid crystal display screen, comprising:
    a first substrate having a first surface;
    a second substrate having a second surface opposite to the first surface of the first substrate;
    a first alignment layer arranged on the first surface of the first substrate, the first alignment layer comprising a carbon nanotube layer with a plurality of parallel first grooves aligned along a first direction, the carbon nanotube layer comprising at least one carbon nanotube film;
    a second alignment layer arranged on the second surface of the second substrate, the second alignment layer comprising a plurality of parallel second grooves, each second groove aligned along a second direction, the second direction being perpendicular to the first direction; and
    a liquid crystal layer sandwiched between the first alignment layer and the second alignment layer, wherein substantially all polarization is achieved by the at least one carbon nanotube film, so that the liquid crystal display screen has no other polarizer.

15. The liquid crystal display screen of claim 14, wherein the at least one carbon nanotube film comprises a plurality of successively oriented carbon nanotube segments joined end to end by van der Waals attractive force therebetween and uniformly distributed in the at least one carbon nanotube film, and each carbon nanotube segment comprises a plurality of carbon nanotubes combined by van der Waals attractive force therebetween.

16. The liquid crystal display screen of claim 15, wherein the first alignment layer comprises multiple stacked carbon nanotube films, and each of the carbon nanotube films is substantially continuous and uniform and has a width in a range from about 1 centimeter to about 10 centimeters.

* * * * *